United States Patent [19]
Fujiwara et al.

[11] Patent Number: 5,776,395
[45] Date of Patent: Jul. 7, 1998

[54] METHOD AND APPARATUS FOR MAKING A BLADE FOR ELECTROPHOTOGRAPHIC DEVICES

[75] Inventors: Yoshinori Fujiwara, Kobe; Takeshi Noda, Kakogawa; Yuichi Shigechika, Kobe; Toshiharu Taniguchi; Arata Tani, both of Akashi, all of Japan

[73] Assignee: Bando Kagaku Kabushiki Kaisha, Kobe, Japan

[21] Appl. No.: 754,774

[22] Filed: Nov. 21, 1996

Related U.S. Application Data

[63] Continuation-in-part of Ser. No. 461,695, Jun. 5, 1995, abandoned.

[30] Foreign Application Priority Data

Jun. 7, 1994 [JP] Japan .................................. 6-150451
Nov. 24, 1995 [JP] Japan .................................. 7-329749

[51] Int. Cl.$^6$ ................................................ B29C 43/08
[52] U.S. Cl. .......................... 264/146; 264/39; 264/148; 264/151; 264/166; 264/216; 425/224; 425/225; 425/296; 425/315; 425/373
[58] Field of Search ................... 264/146, 148, 264/151, 165, 166, 216, 210.1, 328.6, 39; 425/224, 543, 296, 308, 315, 327, 335, 373, 225

[56] References Cited

U.S. PATENT DOCUMENTS

| | | |
|---|---|---|
| 3,312,666 | 4/1967 | Knipp et al. . |
| 3,487,143 | 12/1969 | Bergvall . |
| 4,323,533 | 4/1982 | Bramhall . |
| 5,204,034 | 4/1993 | Sasame et al. . |

*Primary Examiner*—Mathieu D. Vargot
*Attorney, Agent, or Firm*—Marshall, O'Toole, Gerstein, Murray & Borun

[57] ABSTRACT

This details a production method for a blade for electrophotographic devices, made of thermosetting type polyurethane, including the steps of mixing and stirring the liquid polyurethane prepolymer which is a raw material component for a thermosetting type polyurethane polymer and the liquid crosslinking agent, discharging the mixture thereof into a die having a concave cross section in a molding drum, heating it via an endless belt which is in contact with the outer peripheral face of the molding drum and runs with the rotation of the drum 20 to continuously mold a banded blade molding S having a prescribed width, and cutting the blade molding to a prescribed length after cooling it down.

6 Claims, 3 Drawing Sheets

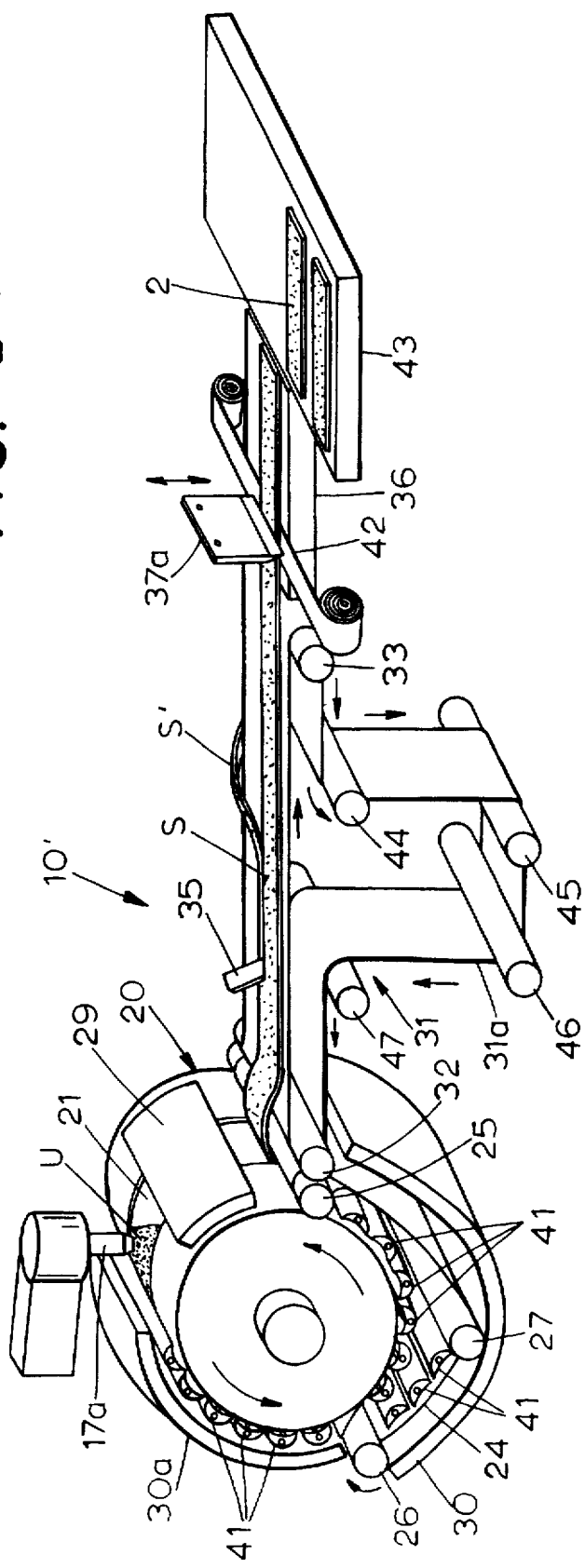
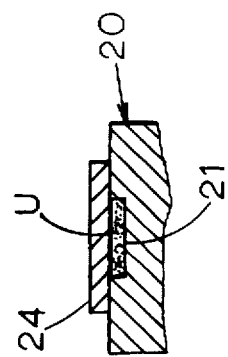
FIG. 2A
FIG. 2B

METHOD AND APPARATUS FOR MAKING A BLADE FOR ELECTROPHOTOGRAPHIC DEVICES

RELATED APPLICATIONS

This application is continuation-in-part application of Ser. No. 08/461,695 filed Jun. 5, 1995, now abandoned.

FIELD OF THE INVENTION

The present invention relates to a blade for electrophotographic devices (referred to as a blade in some cases below), such as a cleaning blade used for removing residual toners on a sensitizer (sensitive drum, belt and the like) and a developing blade for forming a thin layer of toners while electrifying them by friction in a developing device, in electrophotographic system copying machines, printers and facsimile machines, and a production method and production apparatus for the same, particularly to such a blade composed of thermosetting type polyurethane and to a production method and production apparatus for the same.

BACKGROUND OF THE INVENTION

A cleaning blade 2 of this kind is usually used in a state where it is mounted on a metallic holder 3 as shown in FIG. 3. Such a blade has, up to the present, been produced by either of the following two methods.

One production method is called a centrifugal molding method. As shown in FIG. 4(a), a liquid A prepared by mixing and stirring a urethane prepolymer having a terminal isocyanate group and a crosslinking agent (called a chain extending agent or a curing agent in some cases) is injected into a cylindrical hollow drum 51, and the drum 51 is rotated on an axis 52 at high speed to form, by centrifugal force, a liquid tubular layer A having a fixed wall thickness on the inner peripheral face of the drum 51. At the same time, the liquid layer is reacted while heating to form a cylindrical polyurethane sheet mold, which is carefully moved from the drum by hand. After cutting lengthwise and opening the cylindrical mold to form a flat polyurethane sheet B, the polyurethane sheet B is maintained at a prescribed temperature for a prescribed time to subject it to secondary crosslinking. Then, it is further cured at normal temperatures. Next, it is cut to prescribed dimensions as shown in FIG. 4(b) to produce a number of rectangular and tabular cleaning blades 2, after which one side edge part of each cleaning blade 2 is adhered to an end edge of the metallic holder 3 as shown in FIG. 3 with an adhesive, whereby a cleaning blade tool 1 is completed as a finished product.

Another method is a production method called a die molding method. As shown in FIG. 4(c), a metallic holder 3 on which an adhesive is coated beforehand is mounted in split dies 55, 56 and a liquid A, prepared by mixing and stirring a urethane prepolymer of a terminal isocyanate group and a crosslinking agent, is injected into a mold cavity of split dies 55, 56. The liquid is heated for a prescribed time to cure the cleaning blade 2, whereby the blade is molded integrally with the holder 3. Next, the split dies 55, 56 are opened to remove the blade, and after subjecting it to secondary crosslinking and a curing process, the end part of each cleaning blade is cut with a cutter in order to shape an edge (ridgeline), whereby a cleaning blade tool as a product is completed.

Other prior art includes a production method of a polyurethane film described in the examined Japanese Provisional Patent Publication No. HEI 5-70570. In this production method, thermoplastic polyurethane resin pellets are made and placed in an extruder to be melted, whereby the time for extruding and molding to a prescribed shape is reduced. After mixing fixed amounts of a polyol component and a polyisocyanate compound, which are the raw material components for polyurethane, together with a chain extending agent, the mixture is injected into a biaxial extruder to polymerize it and is passed through a die via a measuring pump to biaxially stretch it to a film of about 50 μm, after which it is rolled through a rolling mill after passing through plural cooling rolls.

However, the prior production methods described above leave room for improvement in terms of the following points:

(1) Centrifugal molding method: While it has the advantage that a single molding provides a large number of blades, it takes a long time from injection to extraction since it utilizes a batch system. While a large number of blades are molded at one time at the cleaning blade molding step, the blades must be adhered to holders one by one after the molding step. Accordingly, it is difficult to automate the production steps thereof because of the lack of continuity between main steps.

(2) Die molding method: Dies have to be changed for each kind of product because of the difference in dimensions of blades and form of holders, and in order to mass-produce this system, respective kinds of dies have to be prepared in fair quantities. In addition, the heating furnace receiving these dies must be large as well, and installation for all of the equipment requires a large space, which increases installation costs. Further, productive efficiency is low since installation takes time. Still further, the liquid A has to be injected into dies transported one by one, so lost-shot (continuous discharge) of the liquid A between the adjacent dies or intermittent operation of the casting machine is required; the former is likely to lose material, while the latter is likely to cause weight error.

(3) HEI 5-70570: It is believed that sheets which are thick to some extent can be produced by employing this production method, in which filming is carried out using a die having a large opening. In the case of cleaning blades, the quality thereof depends on the quality of the ridgelines and uniformity in the thickness of the molded product. That is, in order to obtain a constant thickness and high quality ridgeline it is necessary to mold one face (the face in which the ridgeline is formed) of the blade to a mirror face and cut it perpendicularly to the blade face. However, this entails much difficulty in order to obtain a uniform thickness and finish, on at least one face, to a mirror face by extruding moldings from the die. Also, a biaxial extruder is expensive, and therefore increases installation costs, which brings about an increase in production costs. Further, a residue in the biaxial extruder causes heat decomposition and produces foreign matter, which cause quality reduction. Accordingly, it is not practically possible to apply the production method described in the above publication to the production of a cleaning blade.

SUMMARY OF THE INVENTION

This invention has been arrived at in view of the points described above. The object is to provide a blade for electrophotographic devices of a thermosetting type polyurethane which can be produced continuously at high production efficiency, the production processes of which can be readily automated and simplified and the installation cost of which can be reduced, and a production method and production apparatus for the same.

In order to achieve the object described above, the production method for a blade for electrophotographic devices according to the present invention comprises the steps of:

mixing and stirring a liquid polyurethane prepolymer, which is a raw material component for a thermosetting type polyurethane polymer, and a liquid crosslinking agent;

injecting the mixture thereof into a continuous die having a concave cross section and which is heated at a prescribed temperature;

heating the mixture to continuously mold a banded blade molding having a fixed width, and cutting the above blade molding by a fixed length after cooling. Here, the liquid polyurethane prepolymer is the reaction product of high molecular weight polyol and polyisocyanate and includes a polyurethane pseudoprepolymer having low blending ratio of the high molecular weight polyol. Also, the crosslinking agent contains only a crosslinking agent (chain extending agent) in some cases and a high molecular weight polyol in other cases.

The present invention preferably comprises the steps of:

mixing and stirring a liquid polyurethane prepoymer, which is a raw material component for a thermosetting type polyurethane polymer, and a liquid crosslinking agent to prepare a mixture;

injecting the mixture thereof into grooves formed in prescribed dimensions on the outer peripheral face of a molding drum which is heated at a prescribed temperature and is rotating;

filling the mixture described above into a space formed by the groove and an endless belt which covers the groove and runs with the rotation of the molding drum described above;

heating the mixture for a prescribed time to continuously mold a banded blade molding having a prescribed width and thickness;

cutting the above blade molding by a prescribed length after cooling.

The production method described above can include a step pressurizing the mixture injected into a die or groove using the endless belt to continuously mold a banded blade. However, the pressurization causes the overflow and loss of the excessive polyurethane and a pressure device, a clearance device for removing burr (flash) and the like become necessary, whereby apparatus is required to become complex and large. Therefore it is preferred not to mold by pressurization so far as a die or groove can be reliably covered by the endless belt.

According to the method, a space (cavity) is formed by the endless belt covering a groove on the outer peripheral face of the molding drum; the space is filled up with the mixture (fluidic uncured polyurethane) described above; the mixture is heated and cured, while rotating, to be molded into a banded blade molding. The rotating speed of the molding drum and the volume of injection are finely controlled to balance by means described below, and the balance becomes better by allowing the liquid level of the mixture to fluctuate in the space described above, so that no hollow is formed due to the lack of fill. Since a blade molding is molded without pressurization, no burr is formed and the material loss is reduced.

Further, a cutting margin provided at one side edge of the banded blade molding described above is preferably cut continuously with a fixed-edged tool disposed perpendicularly to one face thereof at an initial stage in the cooling described above, while transporting the above blade molding.

The component of the high molecular weight polyol mixed into at least one of the liquids selected from (a) the liquid polyurethane prepolymer and (b) the liquid crosslinking agent, preferably has a number average molecular weight of about 500 to about 5,000 and an average functional group number (f) of $2 \leq f \leq 4$. The number average molecular weight of the high molecular weight polyol component described above resides more preferably in the range of about 1,000 to about 3,000.

The blade for electrophotographic devices produced by the method of the present invention can be used in a cartridge for electrophotographic devices.

The apparatus for producing the blade, for electrophotographic devices, of the present invention comprises a molding drum which includes molding grooves having a concave cross section formed over the entire surface of a peripheral face and which is supported horizontally and rotated around a horizontal central axis; a measuring mix-casting machine, disposed over the above molding drum with a lower discharge port for a mixed solution turned toward the molding grooves described above, for mixing and stirring the liquid polyurethane prepolymer which is a raw material component for a thermosetting type polyurethane polymer and the liquid crosslinking agent; a metallic endless belt which is pressed onto a part of the outer peripheral face of the above molding drum and runs in synchronization with the peripheral speed of the above molding drum; a cooling belt conveyer in which a transporting part for the above blade molding is horizontally disposed with one end part thereof close to an output part for the banded blade molding in the molding grooves of the molding drum; a cooling device for cooling the non-transporting part of an endless belt in this belt conveyor; and a cutter for cutting the above blade molding into fixed lengths.

In the production apparatus of the present invention, a conveyor belt in the belt conveyor described above is an endless conveyor belt, and a ceramic edged tool can be disposed over the horizontally running part of this endless conveyor belt so that one side edge part of the banded blade molding described above can be cut in a longitudinal direction.

A pressure device for supplementing the pressure force of the endless belt described above can be provided at the back face of the above endless belt, pressed toward the outer peripheral face of the above molding drum.

Publicly known components can be used as the components for producing the polyurethane elastomer according to the present invention. The high molecular weight polyol can include: polyether type polyols including polyoxyalkylene glycols such as polyethylene glycol, polypropylene glycol and polyoxytetramethylene glycol; or alkylene oxide adducts such as ethylene oxide and propylene oxide of bisphenol A and glycerine; polyester type polyols obtained by the polymerization reaction of dibasic acids such as adipic acid, phthalic anhydride, isophthalic acid, maleic acid, and fumaric acid with glycols such as ethylene glycol, propylene glycol, 1,4-butanediol, 1,6-hexanediol, and trimethylolpropane; polycaprolactonediol; and polycarbonatediol.

The number average molecular weight of these high molecular weight polyols is preferably in the range of about 500 to about 5,000, preferably about 1,000 to about 3,000.

The diisocyanate compound can include tolylenediisocyanate, 4,4-diphenylmethanediisocyanate, hexamethylenediisocyanate, isophronediisocyante, and 1,4-cyclohexanediisocyanate.

The chain extending agent can include low molecular weight diols such as ethylene glycol, 1,4-butanediol, diethylene glycol, 1,6-hexanediol, and neopentyl glycol, and diamine such as ethylenediamine, hexamethylenediamine, and isophoronediamine. Low molecular weight diols are preferably used.

Further, trimethylolpropane, triethanolamine, glycerine, and ethylene oxide and propylene oxide adducts thereof may be added as a polyfunctional component where necessary.

These polyols and the diisocyanate compounds may be reacted by any of a one shot method, a pseudoprepolymer method and a prepolymer method which are employed in existing polyurethane production methods. The pseudoprepolymer method or the prepolymer method is preferably used since products obtained thereby have stable physical properties and excellent qualities.

In the production of the polyurethane described above, the equivalent ratio of OH/NCO groups is preferably in the range of about 0.8 to about 1.05, more preferably about 0.85 to about 1.00 in terms of the physical properties of the polyurethane formed. Further, a reaction accelerator is used where necessary. This reaction accelerator is an imidazole derivative represented by the following formula [CF 1], concrete examples thereof including 2-methylimidazole and 1,2-dimethylimidazole.

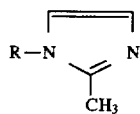
[CF 1]

wherein R represents hydrogen, methyl or ethyl.

The reaction accelerator is used in the range of about 0.01 to about 0.5 parts by weight, preferably about 0.05 to about 0.3 part by weight per 100 weight parts of the prepolymer as an effective amount. Agents having temperature sensitivity or a delayed effect property are preferably used since pot life can be extended and mold-releasing time can be shortened. Concrete examples include 1,8-diazabicyclo[5,4,0]undecene-7-organic salt and 1,5-diazabicyclo[4,3,0]nonene-5-organic salt called block amine and a mixture thereof. In the present invention, a commercially available machine can be used as a two-liquid mix-casting machine used for mixing and stirring the liquid polyurethane prepolymer, which is a raw material component for a thermosetting type polyurethane and the liquid crosslinking agent. A three-throw or more plunger type pump is preferably used for a measuring pump in view of measuring accuracy. A gear pump type can also be used. In particular, because the production apparatus of the present invention is required to employ a rapid curing procedure using a reaction accelerator in order to obtain a molding with a prescribed hardness when it is released from a die, a small volume type stirring mixing chamber disclosed in the examined Japanese Provisional Patent Publication No. HEI 6-11389 is preferable, in which residue is prevented and heat generation caused by reaction heat is suppressed.

According to the production method for the cleaning blade of the present invention having the constitution described above, the mixture of the liquid polyurethane prepolymer which is a raw material component for a thermosetting type polyurethane and the liquid crosslinking agent are continuously cured in a die having a concave cross section and molded to a banded blade molding having a fixed width. Because this molding can be moved from a die continuously as a series, the blade molding can be molded by the required length according to the number of end products and cut by a fixed length. Adhering the blade molding to a holder with an adhesive then completes the end product. Thus, according to the production method of the present invention, the required number of blade moldings of a fixed length can be continuously produced, thereby eliminating waste, and because the blade moldings can be delivered one by one in order, automation, including adhering of the blade molding to the holder, can easily be achieved.

According to the production method, a space (cavity) is formed by the endless belt covering at least a portion of a groove on the outer peripheral face of the molding drum, the space is filled up with the mixture (fluidic uncured polyurethane) described above, the mixture is heated and cured, while rotating, to be molded into a banded blade molding. The rotation speed of the molding drum and the volume of injection are finely controlled to balance by means described below, and the balance becomes better by allowing the liquid level of the mixture to fluctuate in the space described above, so that no hollow is formed due to the lack of fill. The endless belt merely forms the space by covering the groove on the outer peripheral face of the molding drum, that is, the endless belt is not pressurizing the mixture by force, and no burr is produced and the material loss is reduced.

According to the production method, because a blade molding is not cured at an initial stage of cooling, cutting resistance to an edged tool is low, and accordingly a narrow cutting margin can be smoothly cut. In addition, linearity is good and a sharp ridgeline can be formed. Thus, a high quality cleaning blade is obtained.

According to the production method, reaction proceeds smoothly for the following reasons. That is, a high molecular weight polyol component having an average molecular weight less than about 500 lowers viscosity too much and reduces operability. Accordingly, the physical properties of the finished polyurethane obtained are not good. Meanwhile, an average molecular weight exceeding about 5,000 increases viscosity too much and makes mixing difficult. The average functional group number (f) of f=1 prevents polymerization. The number of f≧5, which creates too much functionality, increases the viscosity of the polymer and reduces physical properties as well.

Since the blade for electrophotographic devices is produced by the production method described above, one face (the face where a sweeping ridgeline is formed at one side edge) of the blade is finished to a mirror face, and because a sweeping ridgeline can be sharply formed, it can be preferably used as a blade for electrophotographic devices, particularly as a cleaning blade. And automation of all the production steps can reduce the production cost.

The blade for electrophotographic devices of the present invention is lightweight and inexpensive, and can be used in a cartridge which integrally includes a sensitive drum, toners, a blade and the like used as an engine in electrophotographic devices, and can be preferably included in an interchangeable unit disclosed in the Japanese Provisional Patent Publication No. HEI 6-118857, a process cartridge disclosed in HEI 6-318022.

In use of the production apparatus of this invention, the mixed solution of the liquid polyurethane prepolymer and the liquid crosslinking agent is discharged from the discharge port of the measuring mix-casting machine into a molding groove in a molding drum and is pressurized with a metallic endless belt while heating in the grooves to promote a polymerization reaction, whereby a polyurethane elastomer (blade molding) which has a fixed width and a continuous band shape is continuously formed. In addition, finishing the bottom faces of the molding groove in the molding drum to highly precise mirror face makes it possible to form one face of the blade molding to a mirror face. The shapes of the blade moldings which are continuously moved from the molding groove are put in order while being cooled on the flat belt of a cooling belt conveyor. On the other hand, the temperature of the cooling conveyor belt is increased by absorbing the heat of the blade moldings and therefore cooled by a cooling device. Thus, the molding, which is cooled to close to room temperature, is cured and stabilized. In this state, the molding is cut with a cutter to the length of the end product blade, whereby a polyurethane-made cleaning blade having the prescribed width and thickness is completed.

The production apparatus of this invention cuts a banded blade molding to a prescribed width using a ceramic edged tool before being cured and simultaneously transported. Thus, a sharp ridgeline which is required for the cleaning blade is formed.

When using the production apparatus of this invention, in the case where pressure exerted on the liquid discharged into the grooves in the molding drum described above is insufficient with only the pressure exerted by the endless belt described above, pressure can be applied to the peripheral face of a molding drum from the back of the endless belt with a pressure device.

BRIEF DESCRIPTION OF THE DRAWINGS

This invention will be better understood from the following detailed description taken in conjunction with the accompanying drawings, wherein:

FIG. 2(a) is a perspective view showing another preferred embodiment of the production apparatus for the cleaning blade;

FIG. 2(b) is a cross-sectional view showing a part of a molding drum of the apparatus shown in FIG. 2(a);

DETAILED DESCRIPTION OF THE INVENTION

The preferred embodiments of the cleaning blade of the present invention, and a production apparatus and production method for the same will be explained below based on the above described drawings.

Figure 1:
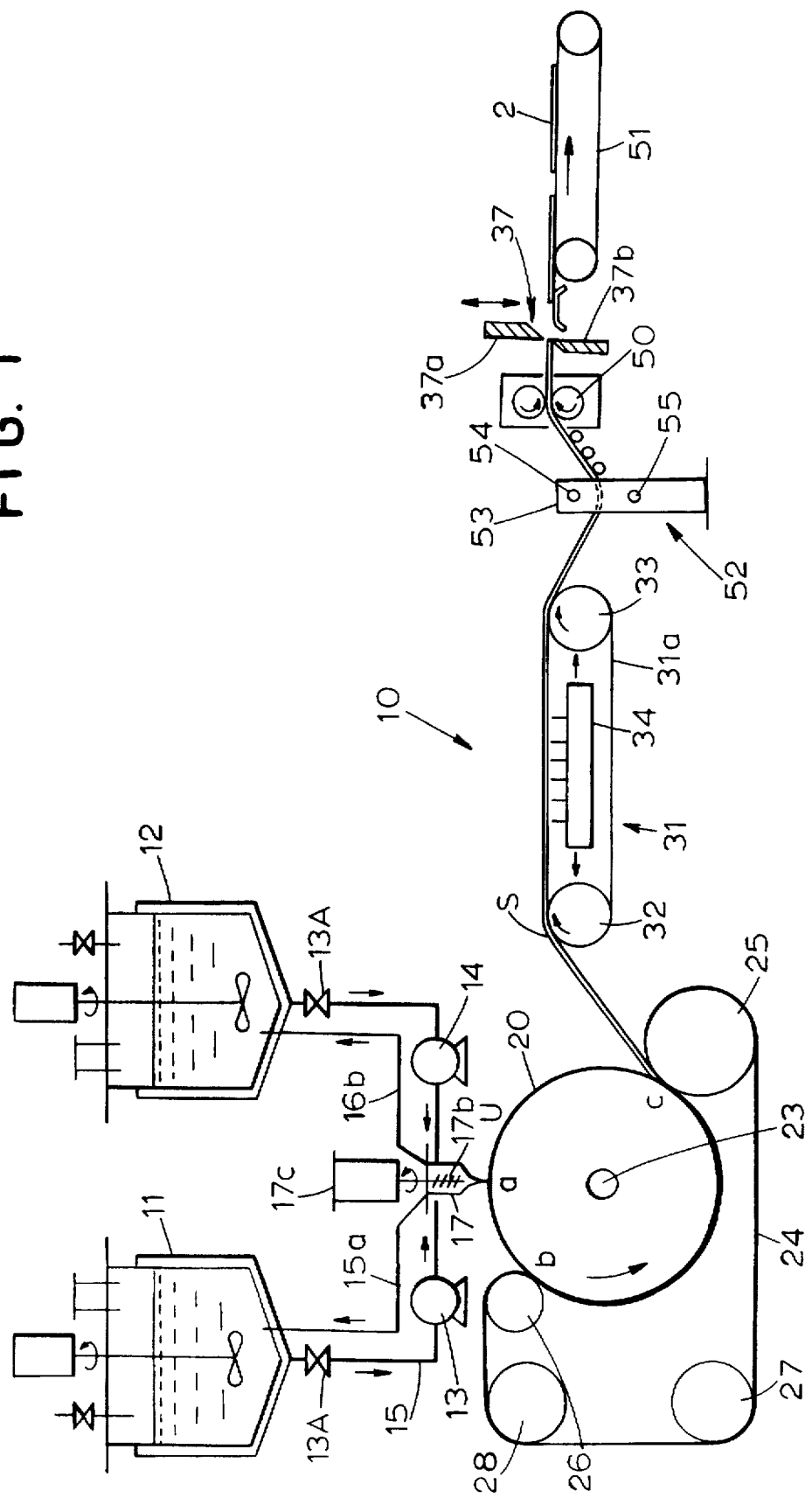
FIG. 1 is a diagrammatic front view showing a preferred embodiment of apparatus for producing a cleaning blade, which is one of the preferred embodiments of the blade for electrophotographic devices, according to the present invention.

As shown in FIG. 1, a production apparatus 10 for a cleaning blade includes two tanks or hoppers 11, 12, and pipe arrangements 15, 16 from the outlets at the bottoms of the respective tanks 11, 12 are connected to a mixing head 17 (two-liquid measuring mix-casting machine) via measuring pumps 13, 14 and valves 13A. The mixing head 17 and the tanks 11, 12 are each connected through return pipe arrangements 15a, 16a. The mixing head 17 may be a prior art structure in which a rotatable stirrer 17b is supported at its upper end portion so that it can be rotated in a chamber equipped with two liquid introduction ports at its upper end, and a discharge port 17a for the mixed liquid at the lower center end. The stirrer is rotated by a motor 17c disposed above the mixing head 17. By use of the measuring pumps 13 and 14 and the mixing head 17, the amount of flow can be controlled with high precision by selecting a drive motor, preventing the residue in the chamber and the like.

As shown in FIG. 2(a), a molding drum 20 includes a molding groove 21 [FIG. 2(b)] having concave cross sections formed around the entire peripheral face of a cylindrical metallic drum, and an endless belt 24 covers a part of the outer peripheral face of the groove 21 to form a space which is filled by an injecting liquid U as shown in FIGS. 2(a) and 2(b). The molding drum 20 is made of, for example, hard aluminum, stainless steel or the like. In the present preferred embodiment, a jacket (not illustrated) for circulating heated steam or oil is provided in the inside of the drum 20 for heating the peripheral face of the drum 20 to a prescribed temperature (about 145° C.) for curing the mixture in the groove 21. The central part of the drum 20 is rotatably supported by a horizontal rotation axle 23 and it is rotated counter-clockwise [as seen in FIG. 2(a)] at prescribed speeds by a drive mechanism (not illustrated) coupled to the axle 23. An AC servomotor is employed as a drive mechanism to control the fluctuation of the rotating speed within ±0.3% (up to now, about ±1.5%) by feedbacking the load fluctuation, taking a high ratio of reduction rate between a drive motor and the molding drum 20 and increasing the speed of rotation (for example, level of 1500 rpm).

An endless belt 24 (see FIG. 1) made of a metallic belt plate such as stainless steel, for forming a molding space (a die cavity), is in contact with the outer peripheral face in substantially the lower half of the molding drum 20. This endless belt 24 is hung over a preheating roll 26 for preheating the endless belt 24, a guide roll 28 for adjusting the belt running (the location of the belt in the axial direction of the rolls), a tension roll 27 for giving the endless belt a tension, and a cooling roll 25 for cooling the endless belt 24 (FIG. 1), and is rotated in the same direction with the surface rotation of the molding drum 20. The endless belt 24 is equipped with a plurality of inscribed heaters (not shown in FIG. 1) such as the heaters 41 illustrated in FIG. 2(a), to heat the belt 24 to a prescribed temperature (about 145° C.). The curing speed of polyurethane can be adjusted by controlling the temperature of the belt 24 and the polyurethane. Further, the mounting for the preheating roll 26 in FIG. 1 is adjustable relative to the drum 20 so as to approach or separate the belt 24 from the molding drum 20, and it is mounted so that the contact-starting point of the peripheral face of the drum 20 with the endless belt 24, that is, the heat-starting position of the injected liquid U, can be adjusted. This constitution makes it possible to finely adjust the heating time between a point a and a point b without changing the peripheral speed of the drum 20 to meet variations in the reactivity of the injecting liquid U which is a polyurethane raw material. The reference number 30 in FIG. 2(a) indicates a circular-arc cover for keeping the plurality of heaters 41 and the heated endless belt 24 warm.

Further, a cleaning-releasing agent (such as the device 29 [FIG. 2(a)]) for cleaning the inside of the molding groove 21 and for spraying a releasing agent, which is not illustrated in FIG. 1, is attached between a point c and the point a of the drum 20. A similar device (not illustrated) is attached at the return side (for example, between the coupled driving roll 27 and the coupled driving roll 28) of the endless belt 24. A device in which, for example, a cleaning cloth rolled in a roll form is urged against the drum 20 to wipe the grooves 21 is also provided but not illustrated.

A cooling belt conveyor 31 is provided in the immediate vicinity of the upper-right cooling roll 25. The belt of this conveyor 31 consists of a metallic endless belt 31a such as a stainless steel belt and it is hung between two upper rolls 32, 33. A cooling device 34 (FIG. 1) is provided under the conveyor 31, and it cools the blade molding S via the endless belt 31a by means of spraying cooling water (shown by arrows) on the belt 31a or by circulating cooling water through the rolls 32, 33. A ceramic straight edged tool 35 [not shown in FIG. 1 but illustrated in FIG. 2(a)] having a low friction coefficient can be inclined upstream and fixed, in a plane perpendicular to the belt 31a, at a position close to a transport-starting position at the horizontal transporting part of the belt conveyor 31, whereby one side edge of the blade molding S can be continuously cut, forming a sharp ridgeline. A supply system (not illustrated) for a cutting fluid for the edged tool 35, which is omitted from the drawing, is also included.

A looseness detector 52 (FIG. 1) feed rolls 50, cutting device 37 and a conveyor 51 are provided in this order at the position adjacent and downstream of the roll 33 of the belt conveyor 31. The looseness detector 52 is equipped with a pair of detectors 54, 55 on a pair of spaced poles 53 placed vertically; the blade molding S is guided between the poles 53 and the detectors 54, 55 to check for slack or looseness. The feed rolls 50 receive a signal from the looseness detector 52 and feed the blade molding S to the cutting device 37 at a prescribed speed (faster than that of the cooling endless belt 31a). The cutting device 37, having a lower edge 37b and an upper edge 37a, cuts the blade molding S to prescribed lengths. The conveyor 51 transports the cut blade molding S to the next steps of the manufacturing process [adhering metallic parts, cutting the width (forming a ridgeline) and the like]. The next steps can take place on the conveyor 51.

The production apparatus 10 of the present preferred embodiment is constituted in the way described above, and the production method of a blade for electrophotographic devices using this production apparatus 10 will now be explained based on FIG. 1.

A prepolymer and a crosslinking agent are respectively placed in the tanks 11 and 12 of the two-liquid measuring mix-casting machine and heated, reduced pressure, stirred and defoamed. The prepolymer and the crosslinking agent thus obtained are supplied to the mixing head 17 by the measuring pumps 13 and 14 and discharged from the discharge port 17a into the molding groove 21 [see FIG. 2(a)] of the molding drum 20 which is adjusted to a temperature of 145° C., while evenly stirring and mixing. On this occasion, the molding drum 20 is rotated counter-clockwise (as seen in FIG. 1) at a prescribed speed (such as one revolution/80 seconds), and the needed amount of the mixture, depending on the peripheral speed of the drum 20 and the grooved depth and width of the groove 21, is continuously injected.

A specific example of the relation between the peripheral speed of the molding drum and the injected volume of the liquid mixture is: In the case where the rectangular cross section of the cavity is 14 mm/width and 2.02 mm/depth and the temperature of the cavity is 150° C., a peripheral speed is 1.729 mm/min. and an injected volume is 52.68 g/min.

The relation between the speed and volume is basically controlled so as to fill the cavity with injected liquid mixture up to the surface but not to overflow, regardless of the rotating speed of the molding drum. A rotating speed is decided at the maximum production efficiency by giving consideration to the time which is required for conducting the subsequent process.

Thus, a rotating speed of the drum, an injection volume of the liquid and a temperature of the cavity are constantly measured and respectively controlled to be the set point.

The reaction of the injected liquid U is promoted at intervals from the point a just under the discharge port 17a to the point b (a position immediately before the contact-starting point of the endless belt 24) of the molding drum 20 and then heated and held or contained by the molding endless belt 24 heated to 145° C. at intervals from the point b to the point c of the molding drum 20. This almost completes the urethane polymerization reaction of the injected liquid U, and a blade molding S having the required width, thickness and a flat mirror face is continuously molded. In the present preferred embodiment, the time when the injected liquid U is moved from the point a to the point b while rotating is set to 10 seconds, and the moving time from the point b to the point c is set to 50 seconds. As described above, the reaction time of the injected liquid U and its molding time can be finely controlled by changing the position of the point b with an approaching/separating operation of the preheating roll 26 to the drum 20 and varying the angle of rotation between the point a and the point b and the angle of rotation between the point b and the point c.

The banded blade molding S thus continuously formed is released from the groove 21 of the molding drum 20 at the point c and guided onto the endless belt 31a of the cooling conveyer 31. Because the endless belt 31a is cooled down to ambient temperatures (about 20° C.) by the cooling device 34, the blade molding S is transported while cooling on the endless belt 31a. Since at the stage that the blade molding S is transferred on the endless belt 31a, the blade molding S is in a state of relatively high temperature (close to 145° C.) and is not sufficiently cooled down, cutting resistance is low. Accordingly, in the present preferred embodiment, the cutting margin (or trimedge) S' of one side edge part in the blade molding S is set to continuously be cut with a ceramic edged tool 35 having a low friction coefficient by utilizing the moving force of the endless belt 31a. This allows a sharp ridgeline having width and straightness which are necessary for a cleaning blade to be formed. The blade molding S is cured by maintaining and cooling it on the horizontal and flat endless belt 31a until it is transferred onto the supporting plate 36 and at the same time, it is formed into a blade as an end product.

The cooled blade molding S is guided from the cooling belt conveyor 31 onto the looseness detector 52, the feed rolls 52, the cutting device 37 and the conveyor 51. The looseness detector 52 guides the blade molding S onto the feed rolls 50 through between the detectors 54, 55 mounted on the poles 53. Since the feed rolls 50 rotate faster than the cooling belt conveyor 31, putting the blade molding S therebetween, they stop when the blade molding S contacts the upper detector 54 and start feeding when the blade molding S contact the lower detector 55 so as to control the production speed of the blade molding S and the process speed of the cutting device 37 (so as not to give an excessive tension to the blade molding S). The cutting device 37 guides the blade molding S between the upper edge 37a and the lower edge 37b and cuts the blade molding S to a prescribed length (to a length as a product). Thus, the production process of the tabular blade 2 (FIG. 3) with a prescribed length is completed.

Figure 3:
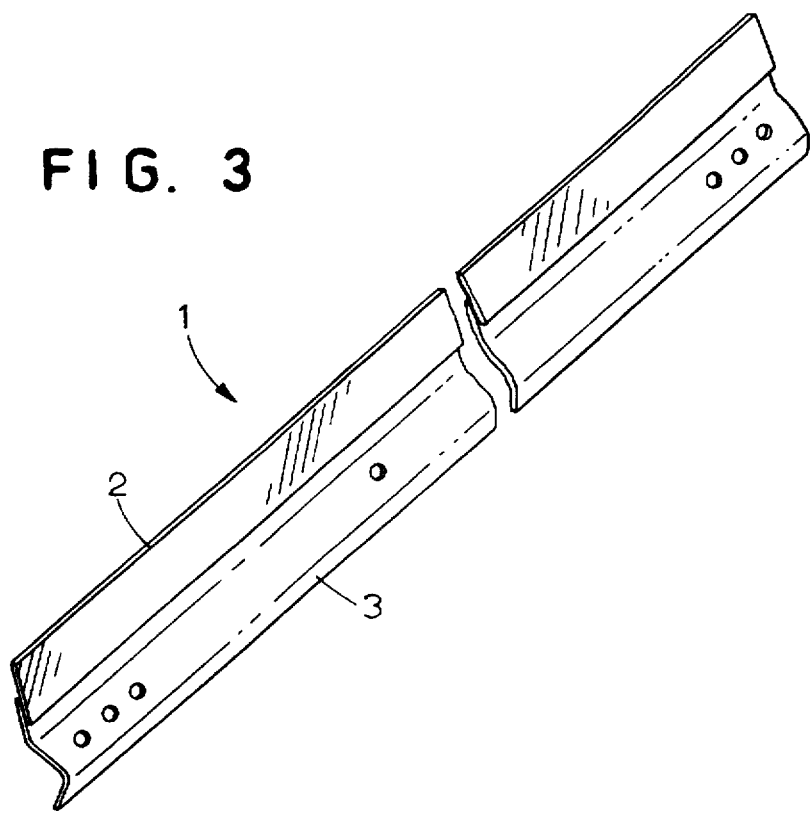
FIG. 3 is perspective view of a blade tool including a cleaning blade of the present invention.
Figure 4A:
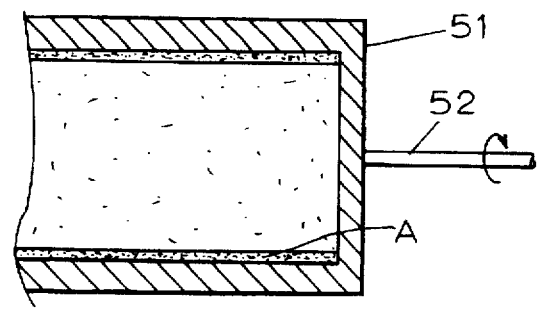
FIG. 4(a), FIG. 4(b) and FIG. 4(c) illustrate conventional production methods.
Figure 4C:
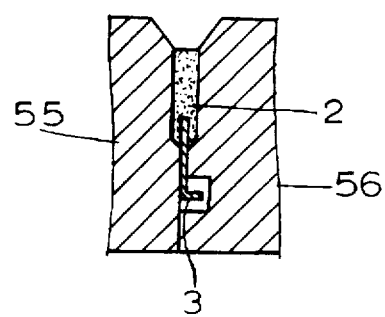
Figure 4B:
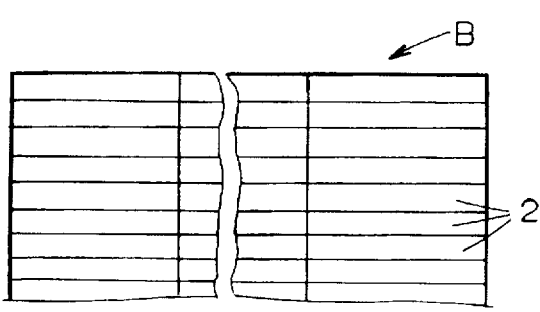

The blade 2 thus produced has one side edge thereof (the side edge opposite from the edge cut by the blade 35) adhered to the end edge part of the metallic holder 3 with an adhesive as shown in FIG. 3, whereby the blade tool 1 as a finished product is completed. When a blade tool 1 is a blade which needs a sharp ridgeline (such as a cleaning blade), the ridgeline is formed by cutting the side edge of the blade 2

(the side edge opposite from the edge adhered to a metallic holder 3) by using a ceramic cutter or the like. In the case of the present invention, since needed pieces of the blade 2 are produced one by one, unlike a conventional centrifugal molding method, the blade 2 can be treated one by one in the adhering step and ridgeline forming step, so these steps can easily be automated.

Next, another preferred embodiment of the production apparatus 10' of the present invention will be explained with reference to FIG. 2(a). The production apparatus 10' of this preferred embodiment is different in the following points from the preferred embodiment described above. That is, as shown in FIG. 2(a), a large number of semicylindrical heaters 41 are provided between the point a and the point b of the outer peripheral face of the molding drum 20, and the heaters 41 are provided on the inner peripheral face side of the endless belt 24 between the point b and the point c of the molding drum 20 and on an inner peripheral face at another part for heating the endless belt 24. The rollers 25 to 27 over which the endless belt 24 is hung are reduced in number from 4 to 3. The cleaning-releasing agent treatment device 29 is provided between the point c and the point a of the molding drum 20. A cover 30a is provided over the heaters 41.

As a cooling means for the endless belt 31a of the cooling belt conveyor 31, a part of its lower running part is set to be inserted into a cooling device (not illustrated) by extending it offset downward via rollers 44 to 47. Since at the stage that the blade molding S is transported onto the endless belt 31a, the blade molding S is in a state of relatively high temperature (close to 145° C.) and is not sufficiently cooled down, cutting resistance is low. Accordingly, in the present preferred embodiment, the cutting margin (or trimedge) S' of one side edge part in the blade molding S is set to continuously be cut with a ceramic edged tool 35 having a low friction coefficient by utilizing the moving force of the endless belt 31a. This allows a sharp ridgeline having the width and straightness which are necessary for a cleaning blade to be formed. The blade molding S is cured by maintaining and cooling it on the horizontal and flat endless belt 31a until it is transported onto the supporting plate 36 and at the same time, it is formed into a blade as an end product.

In addition, the cutting device for cutting the blade molding S includes no lower edge, as shown in FIG. 2 (a), and a liner 42 of a thick roll paper, a soft synthetic resin tape or the like is set on the supporting plate 36 below the upper edge 37a to be sent out of one roll and rolled up on the other roll by the width of the upper edge 37a, every time the upper edge 37a moves up and down. A reciprocating-movable table 43 is vertically connected to the supporting plate 36 to arrange the cleaning blades 2 cut with the upper edge 37a in order on the table 43. Because the rest of this structure is common to the preferred embodiment described above, the same reference numbers as those in FIG. 1 are assigned to common constitutional members and explanations will be omitted. In the two preferred embodiments described above, a constitution of a cooling belt conveyor, a cutting method of the side edge and a cutting method of the length can be combined according to the specifications.

Cutting work for forming the ridgeline of the cleaning blade 2 may be carried out in the state where the cleaning blade 2 is adhered to the holder 3. Accordingly, in this case, the edged tool 35 in the preferred embodiment described above may be omitted, and the cutting margin S' will be cut with another cutting device (not illustrated).

The blending composition of thermosetting type polyurethane used in the present invention and the molding conditions will be shown in the following Table-1 and the physical properties and the dimensions of the molding blade obtained in Table-2.

Preferred Embodiment 1

As shown in Table-1, after heating and stirring a prescribed amount of polycaprolactone ester diol (average molecular weight: 2,000) at 70° C. for 3 hours under reduced pressure (5 mm Hg) to dehydrate it, this was put into a reactor, then 4,4-diphenylmethanediisocyanate was added to the reactor and stirred at 70° C. for 1 to 4 hours under a nitrogen atmosphere, whereby a liquid urethane polymer having a residual isocyanate group content of 7.0% was obtained. On the other hand, with respect to a crosslinking agent component as shown in Table-1, prescribed amounts of 1,4-butanediol, trimethylolpropane and 1,2-dimethylimidazole were heated and stirred at 70° C. for 3 hours under reduced pressure (5 mm Hg) to carry out dehydration, whereby a crosslinking agent having a hydroxyl group equivalent of 45 was obtained.

The prepolymer and crosslinking agent thus obtained were respectively put in the tanks 11 and 12 of a two-liquid measuring mix-casting machine and heated and stirred so that liquid temperatures became as shown in Table-1. This was supplied to the mixing head 17 with the measuring pumps 13 and 14 so that the equivalent ratios became as shown in Table-1 and discharged into the molding groove 21 of the molding drum 20 controlled to a temperature of 145° C. from the discharge port 17a while evenly stirring and mixing. Production processes following this are the same as those explained in the production process using the production apparatus 10.

Preferred Embodiment 2

A cleaning blade was produced by the same method as that in Preferred Embodiment 1 described above, except that the high molecular weight polyol contained in the prepolymer component was changed from polycaprolactone ester diol (average molecular weight: 2,000) to polyethylene adipate diol (average molecular weight: 2,000).

Preferred Embodiment 3

A cleaning blade was produced by the same method as that in Preferred Embodiment 1 described above, except that a pseudoprepolymer method was employed in which a viscosity difference between the prepolymer and the crosslinking agent was decreased and the mixing ratio was set to 1:1.

Preferred Embodiment 4

A cleaning blade was produced by the same method as that in Preferred Embodiment 1 described above, except that the high molecular weight polyol contained in the pseudoprepolymer component and the crosslinking agent component was changed from polycaprolactone ester diol (average molecular weight: 2,000) to polyethylene adipate diol (average molecular weight: 2,000).

In every preferred embodiment, physical properties and dimensional accuracy which are by no means inferior compared to a centrifugal molding method and a die molding method which are conventional methods were shown, and the cleaning blades thus produced could sufficiently stand practical use.

TABLE 1

Blend compositions and molding conditions

| | Preferred Embodiment | | | |
|---|---|---|---|---|
| | 3 | 4 | 1 | 2 |
| Preparation of prepolymer | 1) | 2) | 1) | 1) |
| High molecular weight polyol (weight parts) | 22.2 | 22.2 | 66.1 | 66.1 |
| Polyisocyanate 3) (weight parts) | 27.8 | 27.8 | 27.8 | 27.8 |
| Isocyanate group content (weight parts) | 16.7 | 16.7 | 7.0 | 7.0 |
| Isocyanate group/hydroxyl group equivalent ratio | 9.9 | 9.9 | 3.4 | 3.4 |
| Preparation of crosslinking agent | | | | |
| 1,4-Butanediol (weight parts) | 4.3 | 4.3 | 4.3 | 4.3 |
| Trimethylolpropane (weight parts) | 1.8 | 1.8 | 1.8 | 1.8 |
| High molecular weight polyol 4) (weight parts) | 43.9 | 43.9 | | |
| Reaction accelerator (weight parts) | 0.07 | 0.07 | 0.07 | 0.07 |
| Molding conditions | | | | |
| OH group/NCO group equivalent ratio | 0.86 | 0.86 | 0.95 | 0.95 |
| Liquid temperature | | | | |
| prepolymer (°C.) | 60 | 60 | 70 | 70 |
| crosslinking agent (°C.) | 60 | 60 | 45 | 45 |
| Die temperature | | | | |
| molding roll (°C.) | 145 | 145 | 145 | 145 |
| molding belt (°C.) | 145 | 145 | 145 | 145 |
| cooling belt (°C.) | 20 | 20 | 20 | 20 |
| Time to belt contact point (seconds) | 10 | 10 | 10 | 10 |
| Heat holding time (seconds) | 50 | 50 | 50 | 50 |
| Peripheral speed of molding roll (m/minute) | 2 | 2 | 2 | 2 |

Note:
1) Polycaprolactone ester diol (molecular weight: 2,000)
2) Polyethylene adipate diol (molecular weight: 2,000)
3) 4,4-diphenylmethanediissocyanate
4) Same as that used for preparation of prepolymer
5) 1,2-dimethylimidazole

TABLE 2

Physical properties and dimensional accuracy of molds

| | | Preferred Embodiment | | | |
|---|---|---|---|---|---|
| | | 3 | 4 | 1 | 2 |
| Physical properties of molds 1) | | | | | |
| Hardness | (JIS-A) | 65 | 65 | 66 | 65 |
| Tensile strength | (MPa) | 25 | 22 | 26 | 24 |
| Elongation | (%) | 330 | 330 | 340 | 330 |
| Tearing strength | (KN/m) | 25 | 30 | 26 | 32 |
| Permanent set | (%) | 1 | 1 | 1 | 1 |
| Impact resilience | (%) | 27 | 19 | 28 | 20 |
| Tensile elastic modulus | (MPa) | 4.7 | 4.6 | 4.4 | 4.4 |
| Dimensions of molds | | | | | |
| Thickness | (mm) | 2.0 | 2.0 | 2.0 | 2.0 |
| Width | (mm) | 15.0 | 15.0 | 15.0 | 15.0 |
| Length | (mm) | 320 | 320 | 320 | 320 |
| Roughness of ridgeline | (mm) | 3≦ | 3≦ | 3≦ | 3≦ |
| Linearity | (mm) | ≦0.1 | ≦0.1 | ≦0.1 | ≦0.1 |
| Flatness | (mm) | ≦0.1 | ≦0.1 | ≦0.1 | ≦0.1 |
| Performance of cleaning blades | | | | | |
| Cleanability 2) | | o | o | o | o |
| Abrasion and damage of ridgeline 3) | | o | o | o | o |
| Scratch and deterioration of sensitizer 4) | | o | o | o | o |

The present invention is not limited to the production of a blade for electrophotographic devices and is suitable as well for applications such as, for example, a blade for polyurethane squeezing in screen process printing.

As will be clear from the above explanation, the present invention has the following advantages or effects:

(1) The present invention has made it possible to mold a banded continuous polyurethane elastomer, which is thermosetting polyurethane, without making a sheet by a melt-extrusion molding method of thermoplastic polyurethane, which in turn has made it possible to automate and simplify the production process while maintaining the excellent characteristics of the thermosetting polyurethane and produce a cleaning blade in a high productivity process. Further, installation cost can be reduced.

Because the endless belt is not pressurized by force, material loss due to overflow is prevented, and further, a pressure device or a clearance device for burrs are not necessary, whereby the constitution of apparatus becomes simple and the installation cost can be reduced.

(2) According to the production method described above, not only a narrow cutting margin can be cut smoothly but also a sharp ridgeline can be formed and a cleaning blade having high quality can be obtained.

(3) Further, according to the production method, the reaction proceeds smoothly.

(4) Because the cleaning blade described above has one face of the blade finished to a mirror face and a sweeping ridgeline is sharply formed, the quality is high and the cost is inexpensive.

And the blade for a cartridge in electrophotographic devices described above has high cleanability and abrasion resistance, and the cost is inexpensive.

(5) With the production apparatus described above, the production method of the present invention can surely be enforced, and installation cost can be reduced.

(6) A ceramic-edged tool having low frictional resistance and high durability can be used over a long period of time. Particularly, a sharp ridgeline required for the cleaning blade can be formed therewith.

(7) In the production apparatus described above, when pressure exerted to the outer peripheral face of the molding drum described above is insufficient using only the pressure of the endless belt described above, pressure can be added with a pressure device.

What is claimed is:

1. A production method for producing a banded blade molding for electrophotographic devices, comprising the steps of:

mixing and stirring a liquid polyurethane prepolymer, which is a raw material component for a thermosetting polyurethane polymer, and a liquid crosslinking agent, to prepare a mixture, injecting the mixture thereof into a groove formed on the outer peripheral face of a molding drum which is heated and is rotating, filling said mixture into a space formed by the groove and an endless belt which covers the groove and runs with the rotation of said molding drum, heating said mixture to continuously mold the banded blade molding having a width and thickness, and cutting said blade molding to a length after removing it from the drum and cooling it down.

2. The production method for the banded blade molding for electrophotographic devices as described in claim 1, wherein a cutting margin provided at one side edge of said banded blade molding is cut continuously with a fixed-edged tool disposed perpendicularly to one face thereof at an initial stage in said cooling while transporting said banded blade molding from the drum.

3. The production method for the banded blade molding for electrophotographic devices as described in claims 1 or 2, wherein a high molecular weight polyol component mixed into at least one of the liquid of the polyurethane prepolymer and the liquid of the crosslinking agent has a number average molecular weight of about 500 to about 5,000 and an average functional group number (f) of $2 \leq f \leq 4$.

4. A production apparatus for making a banded blade molding, comprising:

a molding drum which has molding grooves having concave cross sections formed over an entire periphery of an outer peripheral face thereof and which is supported horizontally and rotated around a horizontal center axis, a measuring mix-casting machine disposed over said molding drum with a lower discharge port for a mixed solution turned toward the molding grooves and serving for mixing and stirring a liquid of a polyurethane prepolymer, which is a raw material component for a thermosetting polyurethane polymer, and a liquid of a crosslinking agent, a metallic endless belt which is pressed to a part of an outer peripheral face of the molding drum and which runs in synchronization with a peripheral speed of the molding drum, a cooling belt conveyor on which a transporting part for said blade molding is horizontally disposed with one end thereof close to an output portion for the banded blade molding in the molding grooves of the molding drum, a cooling device for cooling the endless belt in the belt conveyor, and a cutter for cutting said blade molding to a fixed length.

5. The production apparatus for making the banded blade molding described in claim 4, wherein a conveyor belt in said belt conveyor is composed of an endless conveyor belt, and a ceramic edged tool is disposed over a horizontally running part of the endless conveyor belt so that one side edge of said banded blade molding is cut in a longitudinal direction.

6. The production apparatus for making the banded blade molding described in claim 5, wherein a pressure device for supplementing a pressure of said metallic endless belt is provided at a rear face of the metallic endless belt pressed to an outer peripheral face of the molding drum.

* * * * *

UNITED STATES PATENT AND TRADEMARK OFFICE
CERTIFICATE OF CORRECTION

PATENT NO. : 5,776,395
DATED : July 7, 1998
INVENTOR(S) : Fujiwara, et. al.

It is certified that error appears in the above-identified patent and that said Letters Patent is hereby corrected as shown below:

Column 4, line 66, "isophronediisocyante" should be "isophronediisocyanate".

Column 7, line 41, after "is" and before "perspective" insert --a--.

Column 14, lines 15, after TABLE 2 and before "The present invention is not limited . . ." insert "--Note:

Vulcanized rubber physical test method according to JIS K-6301.

Installed in a commercially available copier, and after copying 10,000 sheets, an obtained image was visually observed. Every one was good.

Blades after testing were taken away to investigate the abrasion state thereof with a microscope. Every one showed very little abrasion and was equivalent to those obtained by conventional methods.

The surface of sensitizers after testing were visually observed. Every one was good.

Signed and Sealed this

Twelfth Day of September, 2000

Q. TODD DICKINSON

*Attest:*

*Attesting Officer*  *Director of Patents and Trademarks*